United States Patent
Lakshminarayan et al.

(10) Patent No.: US 8,180,693 B2
(45) Date of Patent: May 15, 2012

(54) PREDICTION OF FINANCIAL PERFORMANCE FOR A GIVEN PORTFOLIO OF MARKETING INVESTMENTS

(75) Inventors: Choudur Lakshminarayan, Austin, TX (US); Edward E. Cullen, Round Rock, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 819 days.

(21) Appl. No.: 12/262,519

(22) Filed: Oct. 31, 2008

(65) Prior Publication Data

US 2010/0114794 A1    May 6, 2010

(51) Int. Cl.
*G06Q 40/00* (2012.01)
(52) U.S. Cl. .......................................... 705/35
(58) Field of Classification Search ................... 705/35, 705/36 R, 37
See application file for complete search history.

(56) References Cited

U.S. PATENT DOCUMENTS

| | | | | |
|---|---|---|---|---|
| 5,457,625 | A * | 10/1995 | Lim et al. | 700/29 |
| 7,606,684 | B1 * | 10/2009 | Pierce | 703/2 |
| 2002/0059116 | A1 * | 5/2002 | Bulatovic et al. | 705/27 |
| 2008/0255935 | A1 * | 10/2008 | Madhavan et al. | 705/14 |
| 2009/0216597 | A1 * | 8/2009 | Cavander et al. | 705/8 |

\* cited by examiner

*Primary Examiner* — Olabode Akintola

(57) ABSTRACT

Methods, systems, and computer program products are provided for quantifying financial impact of marketing investments. Time series data describing the financial performance generated by corresponding marketing investments that are made as a function of time is provided to configure an econometric model. The econometric model, which describes a linear relationship between the financial performance and the corresponding marketing investments, is transformed into an aggregated non-linear econometric model that includes non-linear factors causing the financial performance to change at a varying rate as a function of the marketing investments.

20 Claims, 7 Drawing Sheets

| PERIOD | REVENUE | MV1 | MV2 | · · · | MVx |
|---|---|---|---|---|---|
| M1 | R1 | X11 | X12 | | X1x |
| M2 | R2 | X21 | X22 | | X2x |
| | | | | | |
| Mn | Rn | Xn1 | Xn2 | | Xnx |

TIME SERIES DATA 116

| MV1 ... MV6 | MODEL FINDING | MODEL RECOMMENDATION | PROPOSED CHANGE | DIRECTION |
|---|---|---|---|---|
| Demand Gen Advertising | Shows strong positive ROI Strength across all BU's | Increase in DG investment levels | Current level of investment is 24%. Increase to 25% - 30% | Up |
| Direct Marketing | Shows positive ROI | Continue with current DM investment levels | Current level of investment of 20%. Maintain current level | No Change |
| Event Marketing | Yielding relatively less ROI than other marketing vehicles | Decrease in Events investment levels | Current level of investment 44%. Decrease to between 20% - 25% | Down |
| External Comm./PR AR | Shows good ROI | Increase in PR investment levels | Current level of investment of 5%. Increase to 10% - 15% | Up |
| Field Enablement | Shows positive ROI. Effectiveness likely due to alignment with launch activities | Recommend increase during launch activities. Close(r) linkage with Sales | Current level of investment 5%. Increase to between 5% - 10% | Up |
| Sales Collateral | Shows positive ROI. Effectiveness likely due to alignment with launch activities | Recommend increase during launch activities. Close(r) linkage with Sales | Current level of investment 5%. Increase to between 5% - 10% | Up |

PREDICTION OF FINANCIAL PERFORMANCE FOR A GIVEN PORTFOLIO OF MARKETING INVESTMENTS

BACKGROUND

Companies routinely invest billions of dollars each year in various marketing and product promotion tools to enhance brand preference, gain market share and increase profitability. Allocating limited financial and other corporate resources in various marketing tools such as price positioning, new product introductions, product distribution, and advertising in order to meet or exceed financial performance targets has been a challenge for many businesses. A lack of precise measurement criteria, measurement tools, and business processes for the quantification of the effectiveness of the marketing investments makes the task of resource allocation under budget constraints more challenging. Additionally, the complexities and the dynamic nature of the marketplace further complicate the task of quantifying the financial impact of marketing investments.

BRIEF DESCRIPTION OF THE DRAWINGS

Embodiments of the invention relating to both structure and method of operation may best be understood by referring to the following description and accompanying drawings:

FIG. 2C is a summary in tabular form provided to a decision maker by an embodiment of an optimization module to illustrate changes in investment compared to current investment;

DETAILED DESCRIPTION

Figure 1A:
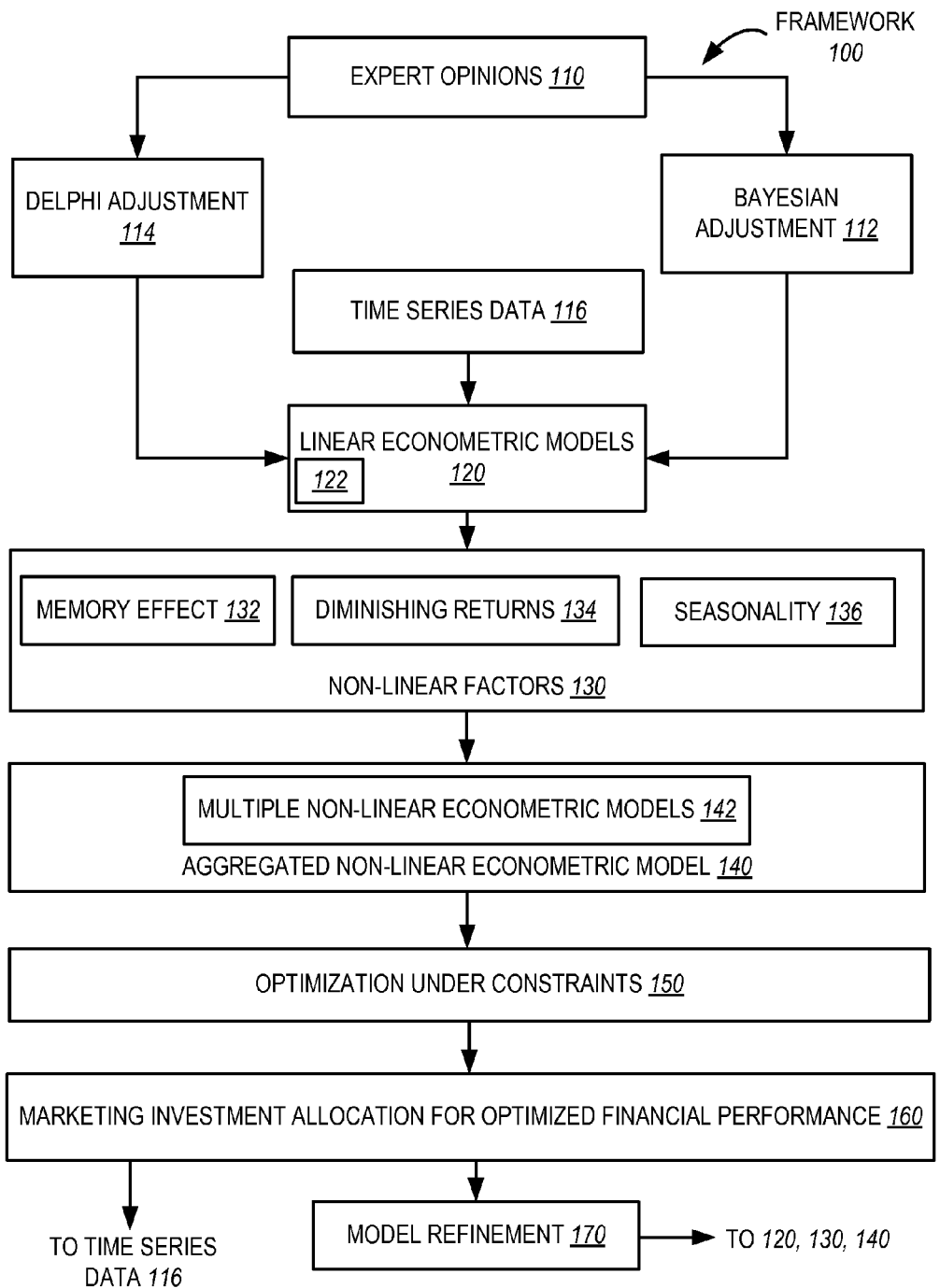
FIG. 1A illustrates an embodiment of a framework for quantifying financial impact of marketing investments.

Novel features believed characteristic of the present disclosure are set forth in the appended claims. The disclosure itself, however, as well as a preferred mode of use, various objectives and advantages thereof, will best be understood by reference to the following detailed description of an illustrative embodiment when read in conjunction with the accompanying drawings. The functionality of various modules, devices or components described herein may be implemented as hardware (including discrete components, integrated circuits and systems-on-a-chip 'SoC'), firmware (including application specific integrated circuits and programmable chips) and/or software or a combination thereof, depending on the application requirements. The accompanying drawings may not to be drawn to scale and some features of embodiments shown and described herein may be simplified or exaggerated for illustrating the principles, features, and advantages of the disclosure.

The following terminology may be useful in understanding the present disclosure. It is to be understood that the terminology described herein is for the purpose of description and should not be regarded as limiting.

Framework—A basic infrastructure designed to provide one or more functions. A framework used in an information technology (IT) environment may typically include electronic hardware, software, and services building blocks that are designed to work with each other to deliver core functions and extensible functions. The core functions are typically a portion of the framework that may not be modifiable by the framework user. The extensible functions are typically a portion of the framework that has been explicitly designed to be customized and extended by the framework user as a part of the implementation process.

Model—A model can be a representation of the characteristics and behavior of a system, element, solution, product, or service. A model as described herein captures the behavior of a marketplace that includes suppliers and consumers of products and services. The model may include a declarative specification of the structural, functional, non-functional, and runtime characteristics of the marketplace. The model may be often used to as a simulation tool to predict future values of the dependent variable based on the input values of the independent variables and to play various what-if scenarios in business planning.

Marketing—As defined by the American Marketing Association, marketing is the activity, set of institutions, and processes for creating, communicating, delivering, and exchanging offerings that have value for customers, clients, partners, and society at large.

Marketing investments—Allocation and expenditure of resources towards one or more marketing activities that are directed to achieve desired business results.

Service—Utility or benefit provided by a provider to a consumer. The provider and the consumer may vary by application and may include an enterprise, a business unit, a business process, an application, a third party, an individual, and similar others. Enterprise services may be provided in the course of conducting the enterprise business.

System—One or more interdependent elements, components, modules, or devices that co-operate to perform one or more predefined functions.

Configuration—Describes a set up of elements, components, modules, devices, and/or a system, and refers to a process for setting, defining, or selecting hardware and/or software properties, parameters, or attributes associated with the elements, components, modules, devices, and/or the system.

Expected financial results and the financial performance of investments made by companies may be measured and benchmarked in terms of financial parameters such as revenues, profits, return on investment (ROI), return on capital (ROC), payback, and similar others. The characteristics of the business-to-consumer (B2C) marketplace such as short sales cycle, relative simplicity of products, limited distribution channels (e.g., retail or direct), well established consumer buying behavior and similar others generally improves the availability of measurable data for a given marketing investment. That is, the impact of marketing investments such as advertising, product rebate campaigns and the like on the revenue of a particular consumer product sold to a consumer may be quantifiable.

In a business-to-business (B2B) marketplace the products and services are typically sold by one business to another business. While companies participating in the B2B marketplace may have sophisticated programs to deliver messaging to their intended target audiences, they have not been effective in quantifying returns on marketing investments. The characteristics of the B2B marketplace may include a diversity of highly complex or advanced technology products, a multiplicity of services associated with the products, complex distribution channels, e.g., products sold via a combination of direct and indirect channels, value added resellers, solution providers, original equipment manufacturers (OEMs) and similar others, adds to the challenge of measuring marketing effectiveness. In addition, in the B2B space, factors such as longer sales cycles and delayed effect of marketing investments on revenues may further complicate the quantification of returns on marketing investments. In an era of shrinking marketing budgets with ever rising revenue goals, measuring marketing effectiveness and modifying investment strategies is a competitive advantage and a business imperative.

Applicants recognize that it would be desirable to provide a framework for the measurement and quantification of the financial impact of marketing investments to determine their effectiveness. That is, it would be desired to provide a robust model operable in a framework that is based on a standardized platform, the model being used to accurately predict financial performance given a portfolio of marketing investments. Applicants further recognize that it would be desirable for the robust model to take into account non-linear factors affecting the behavior of the B2B marketplace including delayed impact of marketing investments on revenues, diminishing impact of marketing investments on revenues, seasonality of demand and similar others.

Systems and methods disclosed herein provide a framework (may also be referred to as a generic architecture from which application specific architectures may be configured) for optimizing financial performance. The framework that is based on a standardized platform provides a non-linear econometric model for accurately predicting financial performance given a portfolio of marketing investments and an optimization module to optimize the financial performance. Time series data describing the financial performance generated by corresponding marketing investments is provided to configure an econometric model. Linear coefficients of the econometric model are adjusted in accordance with the qualitative factors received as inputs from experts. The econometric model is transformed into an aggregated non-linear econometric model that includes non-linear factors that cause the financial performance to change at a varying rate as a function of the marketing investments. An allocation of the marketing investments generated by the aggregated non-linear econometric model is adjusted by applying an optimization algorithm to provide an optimized financial performance.

Framework for Quantifying Financial Performance

FIG. 1A illustrates an exemplary framework 100 for optimizing financial performance, according to an embodiment. The framework 100 includes a plurality of modules that cooperatively interact with one another, with external applications such as statistical application packages and spreadsheets, and with users to provide information describing the effectiveness and the impact of the marketing investments on the financial performance. The plurality of modules includes time series data 116, one or more linear econometric models 120, expert opinions 110 used for Delphi adjustment 114 and Bayesian adjustment 112 of the one or more linear econometric models 120, non-linear factors 130 to transform the one or more linear econometric models 120 into an aggregated non-linear econometric model 140, an optimization under constraint 150 module to provide an optimal allocation of a given portfolio of marketing investments to optimize financial performance 160. Econometrics, as described herein, is the field of economics that is concerned with the application of mathematical statistics and the tools of statistical inference to the empirical measurement of relationships postulated by economic theory. Econometric models, which are often developed in accordance with historical empirical data, are deployed to predict values of dependent variables based the values of one or more independent variables.

The framework 100, which may be based on a standardized, commercially available computer platform, may be used as an easy to use, intuitive tool to plan marketing strategies, assess various marketing budget allocation scenarios and select marketing investment strategies to maximize financial performance including revenues and profits. Additional details of the standardized computer platform are described with reference to FIG. 4.

The framework 100 leverages non-linear modeling to determine marketing vehicles that significantly impact revenues and profits, the Bayesian and Delphi adjustments 112 and 114 to incorporate expert opinions 110 in a quantifiable manner, and mathematical optimization 150 for determining an optimal mix of marketing investments 160 to maximize financial returns. The framework 100 encapsulates the entire process to optimize the marketing investments and provides an easy to use user interface for the decision maker.

As described herein, a marketing vehicle (may also be referred to as a marketing tool or instrument) is simply a form of marketing communication that serves to reach a target audience. Examples of marketing vehicles may include brand advertising, promotional advertising, direct marketing, trade shows and seminars, sponsored events, web marketing and similar others. In an exemplary model to simulate optimized allocation for maximizing the financial performance of a B2B marketplace, marketing investments in nine marketing vehicles were used including brand advertising, demand generation advertising, external communications, sales collaterals, direct marketing, events, field enablement, web marketing and non event sponsorships.

The framework 100 is operable to construct (may also be referred to as configure, define, or generate) one or more linear econometric models 120 based on the time series data 116 as input. A linear econometric model 122 (also referred to as simply an econometric model) included in the one or more linear econometric models 120 is represented by a mathematical equation E100 that linearly relates a dependent variable (e.g., financial performance) and a set of independent variables (e.g., multiple marketing vehicles). In each model a particular set of independent variables may be selected by conducting a statistical analysis to determine the most significant ones having the largest impact on revenue.

Specifically, Equation E100 may be expressed in terms of a linear function as follows:

$$R = \text{Alpha} + \sum_{i=1}^{n} Beta_i * x_i \quad \text{Equation E100}$$

where R (the dependent variable) is the estimated revenue (a measure of financial performance) computed by the linear econometric model 122, Alpha is an intercept coefficient of the linear model and corresponds to the estimated revenue without using any marketing vehicles (e.g., with no marketing effort, referred to as a base revenue), $Beta_i$ is the slope of the linear model associated with the $i^{th}$ marketing vehicle and corresponds to a change in the estimated revenue for each additional dollar of investment in the $i^{th}$ marketing vehicle, $x_j$ (the independent variable) is the actual investment in the $i^{th}$ marketing vehicle, and Alpha, $Beta_1$ through $Beta_{1-n}$ are constants and are referred to as linear coefficients.

Since the one or more linear econometric models 120 may not capture the complexities and the behavior of the B2B marketplace the one or more linear econometric models 120 are enhanced to include other qualitative or subjective factors such as macroeconomics trends (e.g., projections of future IT spending, the effect of prime lending rates, geo-political disturbances, epidemics, wars, global warming, price of oil, and similar others) and expert opinions 110 that influence revenues. Additional details of the impact of qualitative or subjective factors on the one or more the linear econometric models 120 are described with reference to FIG. 1D.

The one or more linear econometric models 120 are also enhanced to include unique, non-linear characteristics of the B2B marketplace compared to those of the B2C marketplace. Adstocking can be used to transfer the effect of an independent variable to future months thereby delaying impact of an investment in a marketing vehicle on revenue, e.g., caused due to a longer sales cycle. Adbudging can be used to comprehend a smaller return on investment as the investments increase. The unique characteristics of the B2B marketplace are captured by transforming the one or more linear econometric models 120 into multiple non-linear models 142 and forming an aggregated non-linear econometric model 140 from the multiple non-linear models 142. Additional details of the transformation from the linear econometric models into non-linear ones are described with reference to FIG. 1E.

An optimization module 150, which performs optimization under budget constraints, assesses marketing investments in various marketing vehicles and recommends an optimized set or portfolio of marketing investments 160 that maximizes the desired financial performance. In addition, the optimization module 150 provides a simple, easy to use interface to the decision maker. Additional details of the optimization module 150 are described with reference to FIG. 1F.

Predicted optimized revenues and corresponding allocations for marketing investments 160 computed by the optimization module 150 may be compared with the actual data by a refinement module 170 to further refine the models 120 and 140 and the non-linear factors 130, thereby improving the fidelity and the accuracy (by reducing the error) of the prediction relative to the one or more linear econometric models 120. The refinement of the linear and non-linear econometric models may be implemented by modifying business rules that may be used to implement the various models.

Time Series Data

Figures 1B, 1C:
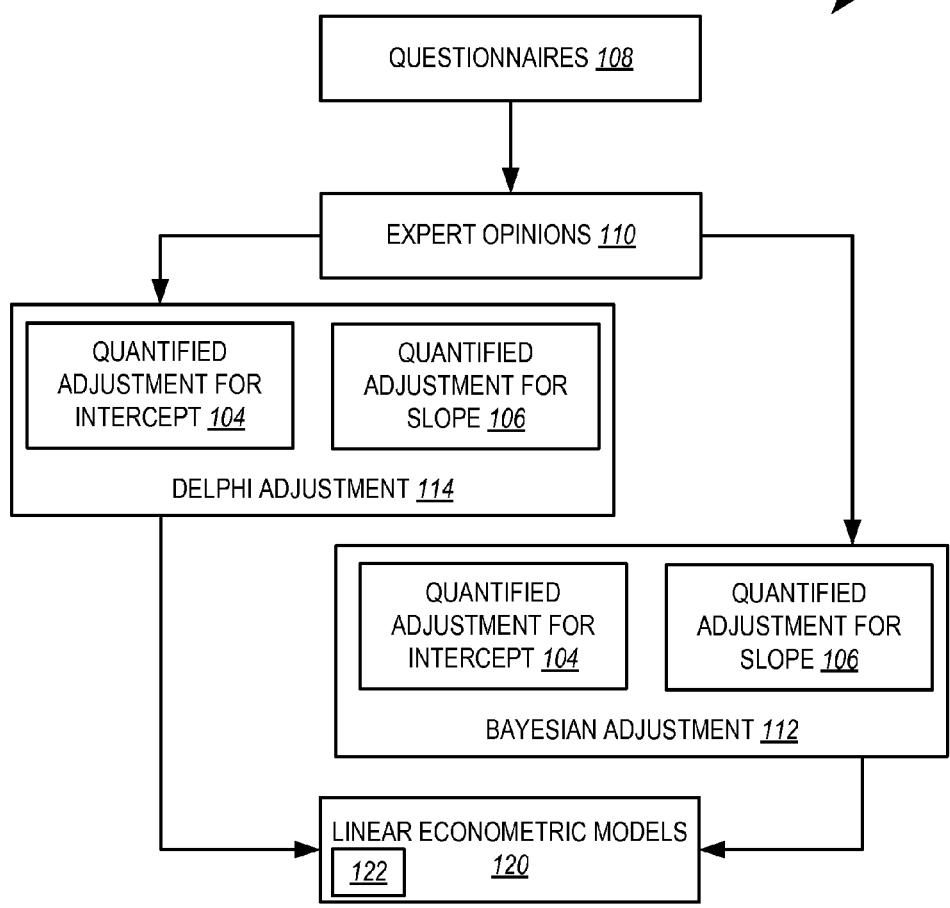
FIG. 1B illustrates, in a tabular form, an embodiment of time series data described with reference to FIG. 1A.
FIG. 1C shows a block diagram of an embodiment of a method to adjust intercept (Alpha) and slope (Beta) coefficients of the one or more linear econometric models described with reference to FIG. 1A.

FIG. 1B illustrates in a tabular form time series data 116 described with reference to FIG. 1A, according to an embodiment. The time series data 116 includes previously recorded actual values for the financial performance, e.g., revenues, generated by investments made in corresponding marketing vehicles (MV1 through MVx) for a defined time period, e.g., monthly, quarterly, annually, and similar other time intervals. The time series data 116 may be recorded corresponding to each business unit, geographic area, key account, product, or similar other classification. As described earlier, the framework 100 is operable to construct one or more linear econometric models 120 based on the time series data 116 used as an input. Regression analysis tools may be used to determine the values for the Alpha (intercept) and Beta (slope) coefficients in the one or more linear econometric models 120 by invoking the principle of least squares.

Delphi and Bayesian Adjustments

FIG. 1C is a block diagram showing an embodiment of a method 180 for adjusting intercept (Alpha) and slope (Beta) coefficients of the one or more linear econometric models 120 described with reference to FIG. 1A. The Delphi adjustment 114 is a systematic and an interactive method based on independent inputs of selected experts. The method relies on collective opinions gathered from a panel of carefully selected experts from the marketing departments and business units within an enterprise. These experts answer a series of questions provided to them via several well designed survey questionnaires 108. A separate questionnaire may be provided to the panel of experts for adjusting the intercept coefficient 104 and the slope coefficient 106.

Questions may be formulated as hypotheses. The experts state their opinion about the relevance of certain drivers of change with regard to their business units and marketing vehicles on an ordinal scale, e.g., on an 8 point scale. An exemplary list of questions may include: (1) Effect of HP pricing strategy in any of the product categories relative to competition, (2) Sub-BU lifecycle (growth, maturity or decline) of the product category, (3) Introduction of new products in a business area by HP or by the competition, (4) Change in current and future trends in market demand for IT spending (5) Strengthening of sales force by HP and streamlining sales processes (6) Change in trends in supplier pricing, (7) Reseller loyalty and a variety of other factors.

Each expert determines a quantitative impact of a qualitative or subjective factor by assigning a numerical value in percentage terms. For example, one expert may determine that the effect of a product life cycle is significant and may thus assign a high value on an eight-point scale. Similarly other experts quantify the influence of the product life cycle. Their stated inputs are consolidated and an average is computed as the expert opinions 110. In the event of wildly differing and dissenting assessments (measured by standard deviation), a discussion is moderated by an experienced and knowledgeable interlocutor to achieve consensus. This approach is applied to every question in the questionnaire and an overall average is computed. This average value is added to the estimated intercept coefficient (Alpha obtained in Equation E100). If the intercept value is "a" and the estimated impact of external factors is 4%, then "a" is updated to "1.04a".

A commercially available web based survey delivery and management tool that provides an easy to use interface for the survey design, delivery and analysis of the responses to the questions may be used to adjust the models and moderate a discussion amongst the experts effectively. Since the econometric model is based on periodic revenues and investments by marketing vehicles each slope coefficient corresponds to the relative effect of a marketing vehicle on revenue.

A separate set of questions are presented to and answered by the experts for updating the slope (Beta) coefficients. The questions are based on the premise that the raison d'etre of marketing is to deliver the right message to the right audience at the right time. So the marketing questionnaire may include questions related to (1) quality of content in the messaging, (2) the ability to target a qualified audience, and, (3) deliver advertising at the appropriate time. The experts answer these questions relative to each one of the marketing vehicles deployed and each slope coefficient 106 is updated according to the estimated average impact of the three drivers of marketing effectiveness. The updated econometric equation serves as the objective function to maximize revenue. Towards this end, a mathematical optimization is invoked as the final step in determining the optimal mix of investments for incremental revenue generation.

The Bayesian adjustment 112 is used to incorporate qualitative or subjective information about the probability distribution associated with the intercept and slope coefficients of the one or more linear econometric models 120 to adjust the intercept and slope coefficients 104 and 106 accordingly. Bayesian models use a probability model that accurately describes the data known as the sampling distribution. The Bayesian models also use subjective information about the parameters of the sampling distribution/probability model and can be viewed as imposing a probability measure. The sampling distribution and the probability measures are combined to derive a posterior distribution. The time series data 116 describing the revenue and corresponding marketing investments serves as the sampling distribution and the expert judgment codified by a probability measure serves as the prior distribution.

Similar to the use of questionnaires to gather expert opinions 110 to make Delphi adjustment 114, questionnaires may be used to gather expert opinions 100 to make the Bayesian adjustment 112. The consensus output from the experts is used to codify the prior distribution, which is used in the Bayesian modeling. Operationally, from the moderated enquiry and feedback, a distribution of values is obtained for each question answered and is modeled by a probability distribution which serves as a prior distribution.

Linear to Non-Linear Model Transformation for the B2B Marketplace

Figure 1D:
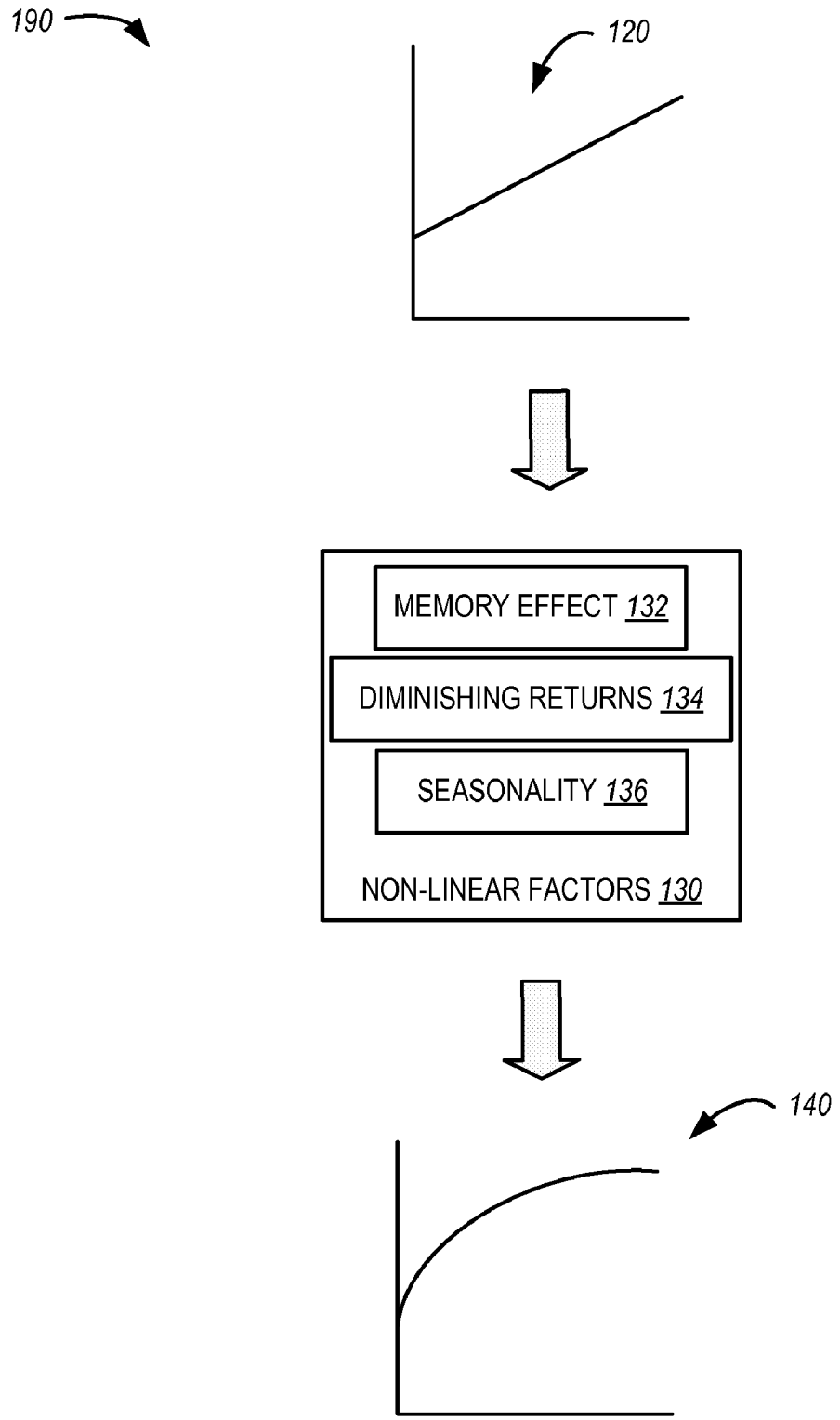
FIG. 1D shows a block diagram of an embodiment of a method to transform linear econometric models to non-linear econometric models described with reference to FIG. 1A.

FIG. 1D is a block diagram of a method 190 to transform linear econometric models to non-linear econometric models described with reference to FIG. 1A, according to an embodiment. As described earlier, linear econometric modeling, when used in a B2B marketplace context, may be subject to inaccuracies and errors since the linear econometric models may not account for non-linear characteristics of the B2B marketplace such as adstocking and adbudging. In marketing applications, it is desirable that the overall statistical models should comprehend memory effects 132, diminishing returns 134, seasonality 136 and a diversity of other factors (not shown) to accurately predict financial performance such as return on investments (ROI). Codifying the non-linear behavior of B2B marketplace into the high fidelity model (shown as the aggregated non-linear econometric model 140) utilizes a combination of business acumen and mathematics. Equation E100 representing the one or more linear econometric models 120 is transformed into multiple non-linear econometric models 142 in accordance with Equation E200 as follows:

$$N(R_i) = [\text{delta} * (R_i)^{}\text{tau}]/[\text{rho} + (R_i)^{}\text{tau}] \quad \text{Equation E200}$$

where $R_i$ is the estimated revenue corresponding to the $i^{th}$ marketing vehicle (per Equation E100), $N(R_i)$ is the non-linear econometric model, and delta, tau and rho are configurable parameters. The particular values for the parameters delta, tau and rho may be selected in the Equation E200 to represent the adbudging 136 effects experienced in a B2B marketplace.

Marketing vehicles exert influence on revenue over a long period known as memory effect. It is simply the extent of the impact of a marketing vehicle on revenue carried over from one time period to subsequent periods. Operationally memory effect is induced by adjusting the drivers to produce exponentially decaying impact on revenue over time and is known as adstocking in marketing parlance. The diminishing impact on ROI known as adbudging postulates smaller return as investments increase. These non-linear effects are sewed into the overall model to capture all the marketing dynamics of the B2B marketplace.

Adstocking is the fraction of a marketing vehicle's impact on revenue over future time periods. As the precise carry-over effect of a vehicle is unknown, adstocking may be defined as a fraction over a range of values between (0, 1), with 0 corresponding to a marketing vehicle having an instantaneous effect of advertising on revenue, and 1 corresponding to a marketing vehicle having a 100% future effect on revenues in the future months. A value of adstocking between 0 and 1 corresponds to x % of its effect being transferred to the future months, decaying gradually in an exponential fashion. Based on historical and simulated data derived from experiments the range of values for adstocking is observed to be typically between (0.25, 45). Searching for the best adstocking levels among all the nine marketing vehicles described may require examining over 100,000 models per business unit.

Seasonality 136 effects may be included by using techniques such as seasonally adjusted time series data and state space model based method for seasonal adjustment. The aggregated non-linear econometric model 140 is an aggregation of the non-linear econometric models 142 to accurately quantify the statistical relationship between revenue and the corresponding marketing vehicles.

Optimization

Figure 1E:
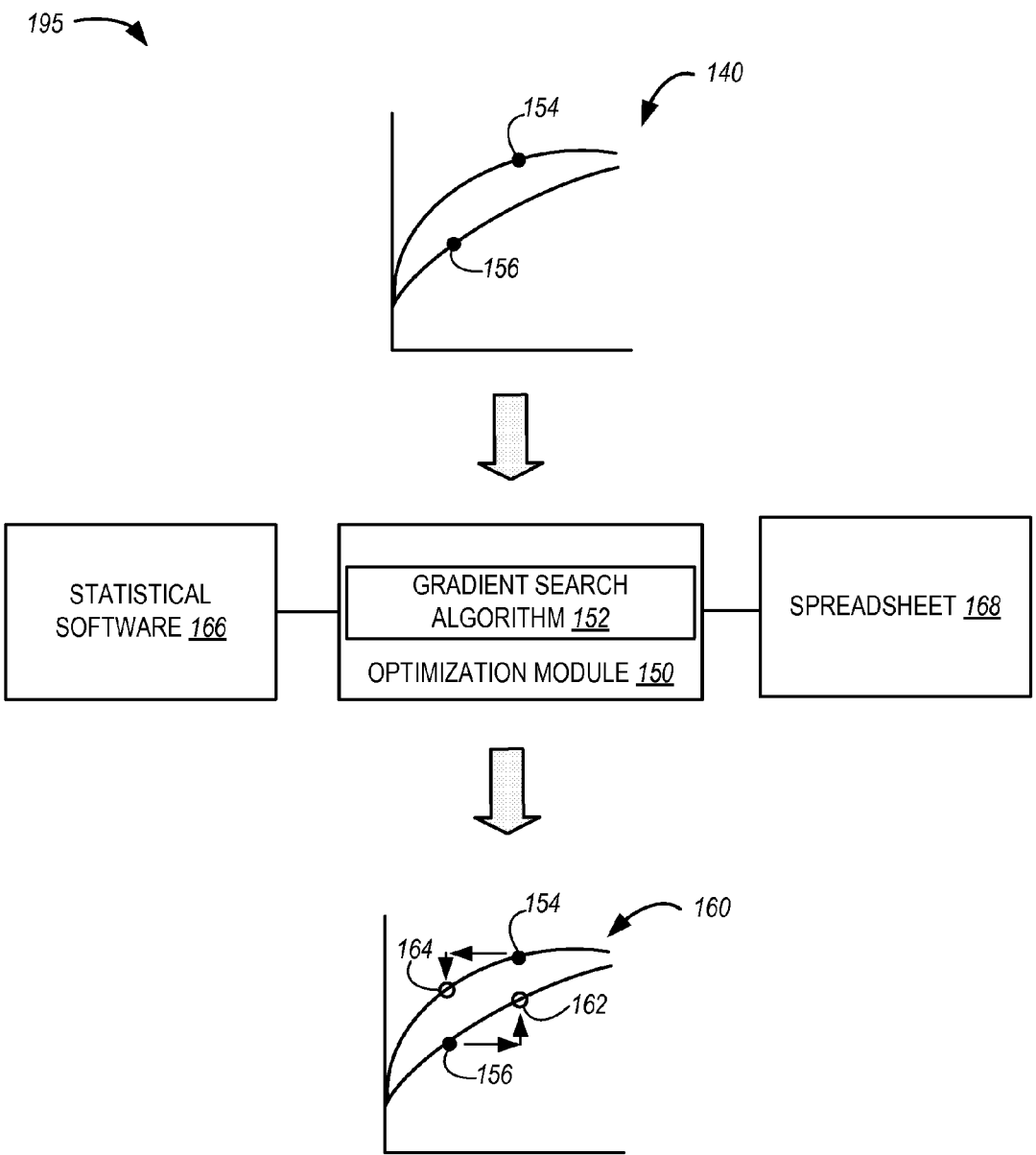
FIG. 1E shows a block diagram of an embodiment of a method to perform optimization on an aggregated non-linear econometric model described with reference to FIG. 1A.

FIG. 1E is a block diagram of a method 195 to perform optimization on the aggregated non-linear econometric model 140 described with reference to FIG. 1A, according to an embodiment. The optimization module 150 is operable to maximize revenue generated by marketing investments subject to constraints on the overall marketing budget (business unit level, country level) and individual marketing investments expenditures (minimum and maximum level constraint per marketing investment).

The optimization module 150 uses a revenue equation estimated from the time series data 116 as the objective function. The objective is typically a non-linear function (e.g., Equation E200) as defined by the aggregated non-linear econometric model 140. Using the overall planned budget and individual constraints on the marketing vehicles, a gradient search algorithm 152 is launched to find an optimal set of marketing investments to provide the highest yield in terms of desired financial performance such as revenues and profits. Prior to optimization, a non-linear, profit (Y-axis) versus investment (X-axis), curve for product A shows an initial marketing investment 154 and a non-linear profit/investment curve for product B shows an initial marketing investment 156. After optimization, the recommended investment allocations for optimized financial performance 160, per computations performed by the optimization module 150, are shown to have a shift (increase) in marketing investment 156 to investment 162 and a shift (decrease) in marketing investment from investment 154 to investment 164.

The platform 100 provides a built-in tool with a spreadsheet 168 interface to implement the marketing portfolio optimization. This tool enables the user (typically a financial decision maker or marketing professional) to test various what-if marketing scenarios and determine the best marketing investment strategy that provides the highest benefit in terms of desired revenues and profits.

The optimization algorithm is the gradient search algorithm 152 known as generalized reduced gradient (GRG) procedure. The GRG methods, which are selectable in many commercially available spreadsheet tools, are algorithms for solving nonlinear programs of general structure. The framework 100 provides a seamless conduit to incorporate the objective function built or estimated in an external platform executing statistical software 166 (including packages such as SAS, EXCEL, MATLAB, S-Plus, and similar others). The optimization module 150 provides a utility to load the data and a custom interface that can perform analyses at various levels of granularity (country, business unit, product line levels).

There is a significant improvement in the prediction of the revenues for a given portfolio of marketing investments using the framework 100 compared to the traditional linear model based predictions. In a particular marketing investment application, the aggregated non-linear model 140 provided by the framework 100 results in an overall squared coefficient of correlation that is approximately equal to 80% and the average absolute percent error is approximately equal to 10%.

Optimized Return on Investment

Figure 2A:
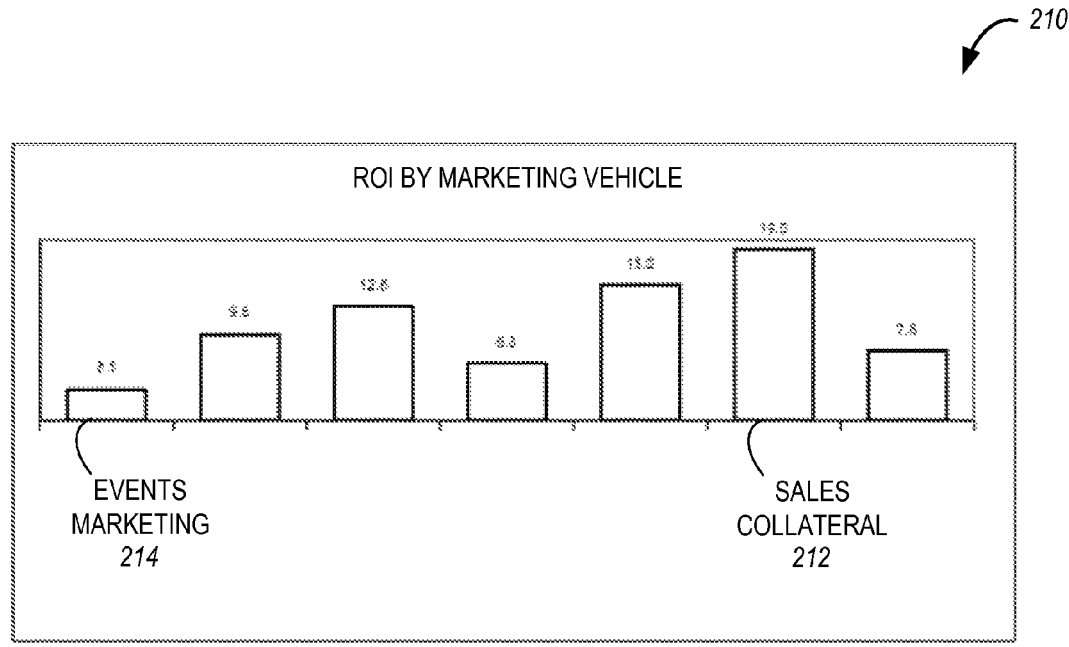
FIG. 2A is a histogram generated by an embodiment of an optimization module to illustrate an optimized return on investment corresponding to each marketing vehicle.
Figure 2B:
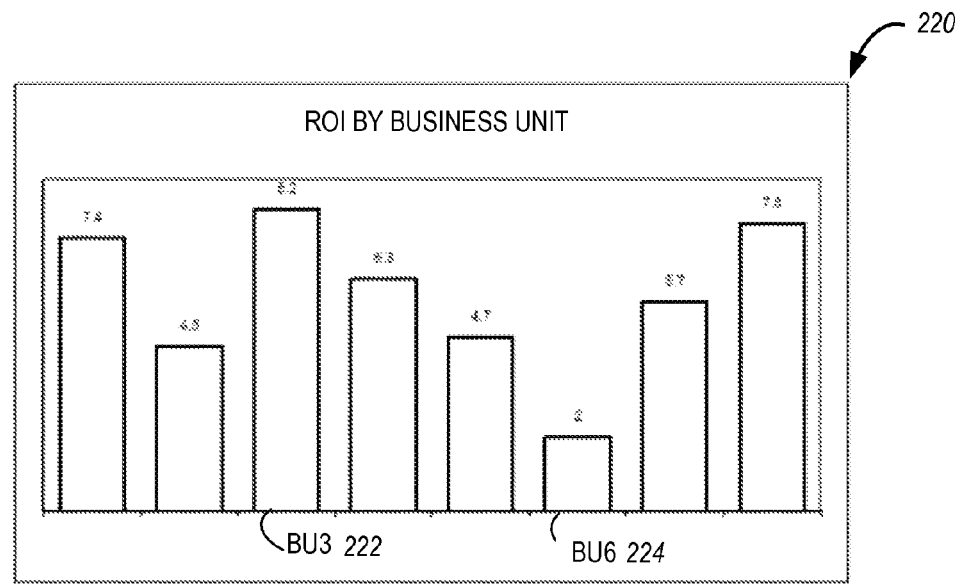
FIG. 2B is a histogram generated by of an embodiment an optimization module to illustrate an optimized return on investment corresponding to each business unit.

FIG. 2A is a histogram 210 generated by the optimization module 150 to illustrate an optimized return on investment corresponding to each marketing vehicle, according to an embodiment. FIG. 2B is a histogram 220 generated by the optimization module 150 to illustrate an optimized return on investment corresponding to each business unit, according to an embodiment. FIG. 2C is a summary in tabular form 230 provided to a decision maker by the optimization module 150 to illustrate changes in investment compared to current investment, according to an embodiment. Referring to FIG. 2A, a sales collateral marketing vehicle 212 provides the highest ROI of about 19% while an events marketing vehicle 214 provides the lowest ROI of about 3.5%. Referring to FIG. 2B, a business unit #3 222 provides the highest ROI of about 8.2% while a business unit #6 224 provides the lowest ROI of about 2%. Referring to FIG. 2C, the optimized results indicate that investment in the sales collateral marketing vehicle should be increased, e.g., by a factor of 2x, and the investment in event marketing should be decreased, e.g., by a factor of 0.5x. Referring to FIG.'s 2A, 2B, and 2C, the histograms 210 and 220 and summary table 230 are indicative of the marketing effectiveness of the investments made in the corresponding marketing vehicles.

Method for Optimizing Financial Performance

Figure 3:
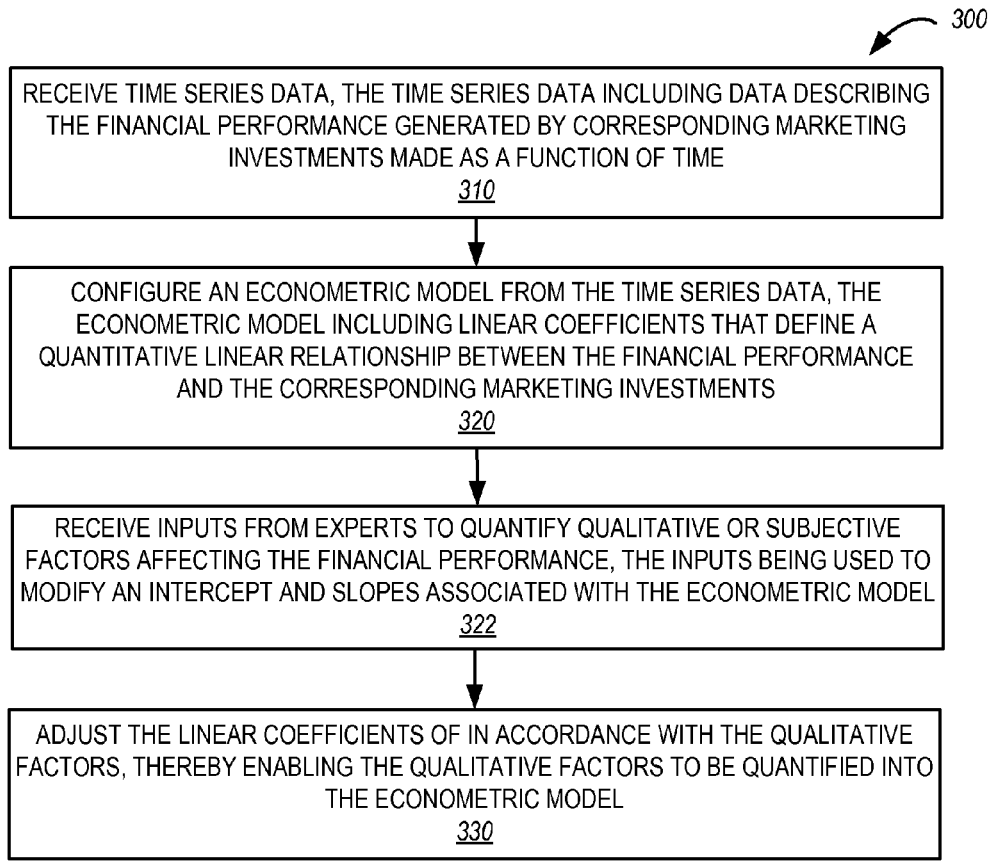
FIG. 3 is a flow chart of an embodiment of a method for predicting financial performance.

FIG. 3 is a flow chart of a method 300 for optimizing financial performance, according to an embodiment. In a particular embodiment, the method can be used for predicting and optimizing financial performance using the framework 100 described with reference to FIG. 1A.

At process 310, time series data is received, the time series data including data describing the financial performance generated by corresponding marketing investments made as a function of time. At process 320, an econometric model is configured from the time series data, the econometric model including linear coefficients that define a quantitative linear relationship between the financial performance and the corresponding marketing investments. The configuring of the operation model includes defining the linear coefficients such as the intercept and slope coefficients of the linear econometric model. At process 330, the linear coefficients of the econometric are adjusted in accordance with the qualitative factors, thereby enabling the qualitative factors to be quantified into the econometric model. At process 340, the econometric model is transformed into an aggregated non-linear econometric model, the aggregated non-linear econometric model including non-linear factors that cause the financial performance to change at a varying rate as a function of the marketing investments. At process 350, an allocation of the marketing investments generated by the aggregated non-linear econometric model is adjusted by applying an optimization algorithm included in the optimization module to provide an optimized financial performance.

It is understood, that various steps described above may be added, omitted, combined, altered, or performed in different orders. For example, a process 322 may be added before process 330. At process 322, inputs are received from experts to quantify qualitative or subjective factors affecting the financial performance, the inputs being used to modify an intercept and slopes associated with the econometric model.

Benefits of the tools and techniques for predicting financial performance include a framework that uses a standardized computer platform to provide easy to use interfaces for selecting the optimum portfolio of marketing investments. The framework 100 provides high fidelity models that accurately predict the non-linear behavior and characteristics of the B2B marketplace. In addition, qualitative and subjective factors such as macroeconomic trends that have an effect on the revenues are quantified and incorporated into the overall model.

Computer System

Figure 4:
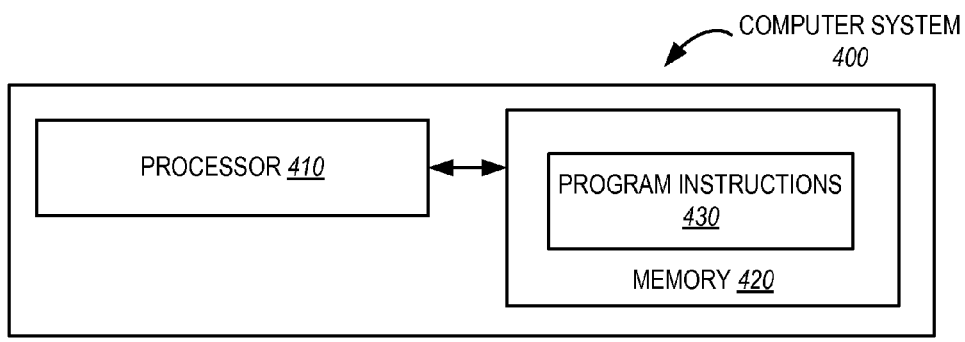
FIG. 4 illustrates a block diagram of an embodiment of a computer system.

FIG. 4 illustrates a block diagram of a computer system 400, according to an embodiment that can be used to implement framework 100 and methods 180, 190, 195, and 300. The computer system 400 includes a processor 410 coupled to a memory 420. The memory 420 can be operable to store program instructions 430 that are executable by the processor 410 to perform one or more functions. It should be understood that the term "computer system" can be intended to encompass any device having a processor that can be capable of executing program instructions from a memory medium. In a particular embodiment, the various functions, processes, methods, and operations described herein may be implemented using the computer system 400. For example, the framework 100 or any components thereof, may be implemented using the computer system 400.

The various functions, processes, methods, and operations performed or executed by the system 400 can be implemented as the program instructions 430 (also referred to as software or simply programs) that are executable by the processor 410 and various types of computer processors, controllers, central processing units, microprocessors, digital signal processors, state machines, programmable logic arrays, and the like. In an exemplary, non-depicted embodiment, the computer system 400 may be networked (using wired or wireless networks) with other computer systems.

In various embodiments the program instructions 430 may be implemented in various ways, including procedure-based techniques, component-based techniques, object-oriented techniques, rule-based techniques, among others. The program instructions 430 can be stored on the memory 420 or any computer-readable medium for use by or in connection with any computer-related system or method. A computer-readable medium can be an electronic, magnetic, optical, or other physical device or means that can contain or store a computer program for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, a few specific examples of financial performance associated with corresponding marketing vehicles are described. The illustrative framework for optimizing allocation of the marketing investments to maximize financial returns can be used with any suitable utility/investment models. That is, the illustrative techniques may be used to maximize any utility delivered by an optimized set of investments. For example, the illustrative techniques may be used to improve total customer experience on a web site based on customer dependent web metrics and satisfaction ratings. In the claims, unless otherwise indicated the article "a" is to refer to "one or more than one".

What is claimed is:

1. A method for predicting financial performance, the method comprising:
    receiving time series data, the time series data including data describing the financial performance generated by corresponding marketing investments made as a function of time;
    configuring, by a computer processor, an econometric model from the time series data, the econometric model defining a linear relationship between the financial performance and the corresponding marketing investments; and
    transforming, by said computer processor, the econometric model into an aggregated non-linear econometric model, the aggregated non-linear econometric model including non-linear factors that cause the financial performance to change at a varying rate as a function of the marketing investments.

2. The method according to claim 1 further comprising:
    the non-linear factors comprising at least one of a memory effect, a diminishing return factor, and a seasonality factor.

3. The method according to claim 2 further comprising:
    the memory effect is configured as a fraction of one of the marketing investments on the revenues over future time periods, the fraction varying between 0 and 1 with 0 being indicative of an instantaneous effect of the one of the marketing investments on the revenues and 1 being indicative a future effect of the one of the marketing investments on the revenues.

4. The method according to claim 1 further comprising:
    the aggregated non-linear econometric model providing an improved prediction of the revenues compared to the econometric model.

5. The method according to claim 1 further comprising:
    the financial performance being measured by at least one of revenue, profit, and return on investment.

6. The method according to claim 1 further comprising:
    the financial performance and the corresponding marketing investments being associated with business-to-business transactions.

7. The method according to claim 1 further comprising:
    receiving inputs from experts to quantify qualitative factors affecting the financial performance, the inputs being used to modify an intercept and slopes associated with the econometric model.

8. A computer system for predicting financial performance, the computer system comprising:
    a computer processor; and
    logic instructions on tangible computer readable storage media and executable by the computer processor to cause the computer processor to:
    receive time series data, the time series data including data describing the financial performance generated by corresponding marketing investments made as a function of time;
    configure an econometric model from the time series data, the econometric model defining a linear relationship between the financial performance and the corresponding marketing investments;
    transform the econometric model into an aggregated non-linear econometric model, the aggregated non-linear econometric model including non-linear factors that cause the financial performance to change at a varying rate as a function of the marketing investments.

9. The computer system according to claim 8 further comprising:
    logic instructions to cause the computer processor to define the non-linear factors to include at least one of a memory effect, a diminishing return factor, and a seasonality factor.

10. The computer system according to claim 9 further comprising:
    logic instructions to cause the computer processor to configure the memory effect as a fraction of one of the marketing investments on the revenues over future time periods, the fraction varying between 0 and 1 with 0 being indicative of an instantaneous effect of the one of the marketing investments on the revenues and 1 being indicative a future effect of the one of the marketing investments on the revenues.

11. The computer system according to claim 10 further comprising:
    logic instructions to cause the computer processor to provide the aggregated non-linear econometric model with an improved prediction of the revenues compared to the econometric model.

12. The computer system according to claim 8 further comprising:
    logic instructions to cause the computer processor to provide the financial performance that is measured by at least one of revenue, profit, and return on investment.

13. The computer system according to claim 8 further comprising:
   logic instructions to cause the computer processor to provide the financial performance and the corresponding marketing investments that are associated with business-to-business transactions.

14. The computer system according to claim 8 further comprising logic instructions to cause the computer processor to:
   receive inputs from experts to quantify qualitative factors affecting the financial performance, the inputs being used to modify an intercept and slopes associated with the econometric model.

15. A computer program product for predicting financial performance, the computer program product comprising:
   logic instructions on a non-transitory computer readable storage executable to cause a computer processor to:
      receive time series data, the time series data including data describing the financial performance generated by corresponding marketing investments made as a function of time;
      configure an econometric model from the time series data, the econometric model defining a linear relationship between the financial performance and the corresponding marketing investments;
      transform the econometric model into an aggregated non-linear econometric model, the aggregated non-linear econometric model including non-linear factors that cause the financial performance to change at a varying rate as a function of the marketing investments.

16. The computer program product of claim 15 further comprising:
   logic instructions on the computer readable storage executable to cause the computer processor to define the non-linear factors to include at least one of a memory effect, a diminishing return factor, and a seasonality factor.

17. The computer program product of claim 16 further comprising:
   logic instructions on the computer readable storage executable to configure the memory effect as a fraction of one of the marketing investments on the revenues over future time periods, the fraction varying between 0 and 1 with 0 being indicative of an instantaneous effect of the one of the marketing investments on the revenues and 1 being indicative a future effect of the one of the marketing investments on the revenues.

18. The computer program product of claim 15 further comprising:
   logic instructions on the computer readable storage executable to cause the computer processor to provide the aggregated non-linear econometric model with an improved prediction of the revenues compared to the econometric model.

19. The computer program product of claim 15 further comprising:
   logic instructions on the computer readable storage executable to cause the computer processor to provide the financial performance that is measured by at least one of revenue, profit, and return on investment.

20. The computer program product of claim 15 further comprising:
   logic instructions on the computer readable storage executable to cause the computer processor to provide the financial performance and the corresponding marketing investments that are associated with business-to-business transactions.

\* \* \* \* \*